United States Patent
Berte

(10) Patent No.: US 12,470,090 B2
(45) Date of Patent: Nov. 11, 2025

(54) SPACE-BASED SOLAR POWER SYSTEM

(71) Applicant: Overview Energy Inc., Ashburn, VA (US)

(72) Inventor: Marc Berte, Leesburg, VA (US)

(73) Assignee: Overview Energy Inc., Ashburn, VA (US)

( * ) Notice: Subject to any disclaimer, the term of this patent is extended or adjusted under 35 U.S.C. 154(b) by 0 days.

(21) Appl. No.: 19/249,552

(22) Filed: Jun. 25, 2025

(65) Prior Publication Data

US 2025/0323530 A1 Oct. 16, 2025

Related U.S. Application Data

(62) Division of application No. 18/345,343, filed on Jun. 30, 2023.

(60) Provisional application No. 63/368,534, filed on Jul. 15, 2022.

(51) Int. Cl.
| | |
|---|---|
| *H02J 50/30* | (2016.01) |
| *B64G 1/42* | (2006.01) |
| *B64G 1/44* | (2006.01) |
| *B64G 1/50* | (2006.01) |
| *B64G 1/66* | (2006.01) |

(52) U.S. Cl.
CPC ............ *H02J 50/30* (2016.02); *B64G 1/4282* (2023.08); *B64G 1/443* (2013.01); *B64G 1/503* (2013.01); *B64G 1/66* (2013.01)

(58) Field of Classification Search
CPC ............. B64G 1/428–446; H02S 10/40; H02S 40/30–38
See application file for complete search history.

(56) References Cited

U.S. PATENT DOCUMENTS

| | | | |
|---|---|---|---|
| 4,305,555 | A | 12/1981 | Davis |
| 5,260,639 | A | 11/1993 | De Young |
| 2010/0276547 | A1 | 11/2010 | Rubenchik |
| 2016/0056321 | A1 | 2/2016 | Atwater |
| 2016/0079810 | A1 | 3/2016 | Frantz |
| 2020/0153287 | A1 | 5/2020 | Polk |
| 2022/0236509 | A1* | 7/2022 | McKenna .......... G02B 6/02395 |
| 2023/0035481 | A1 | 2/2023 | Tillotson |

(Continued)

FOREIGN PATENT DOCUMENTS

| | | | | |
|---|---|---|---|---|
| CN | 207588797 | U | * 7/2018 | |
| CN | 113644876 | A | * 11/2021 | ............. H02S 40/30 |
| EP | 2056144 | A1 | 5/2009 | |

OTHER PUBLICATIONS

CN-113644876-A English (Year: 2021).*

(Continued)

*Primary Examiner* — Bach T Dinh
(74) *Attorney, Agent, or Firm* — Butzel Long

(57) ABSTRACT

Implementations of the disclosed subject matter provides a system having an artificial light source disposed at a distance from earth or other celestial body, where the artificial light source is configured to project one or more beams of light onto the earth or other celestial body. The system may include a photovoltaic array disposed in an area on the earth or other celestial body that is 200 m-20 km or more in any one dimension that is configured to receive the projected one or more beams of light and is configured to convert the received one or more beams of light into electricity.

5 Claims, 4 Drawing Sheets

(56) References Cited

U.S. PATENT DOCUMENTS

2023/0130351 A1* 4/2023 Lam .................. B64G 1/44
307/104
2024/0067366 A1 2/2024 Virdee

OTHER PUBLICATIONS

CN-207588797-U English (Year: 2018).*
International Search Report and Written Opinion issued in App. No. PCT/US2023/026775, mailing date Oct. 11, 2023, 14 pages.
International Preliminary Report on Patentability issued in App. No. PCT/US2023/026775, mailing date Jan. 30, 2025, 8 pages.
Johnson et al., "Efficiency of continuous-wave solar pumped semiconductor lasers", Optics and Lawer Technology 47 (2013)194-198.
Rubenchik et al., "Solar Power Beaming: From Space to Earth", May 2009, Lawrence Levermore National Laboratory, 16 pages.
Hyde et al., "Optical Power-Beaming from Satellite Power-Stations: Economic Imperatives and Provision of High Value-Adding Electrical Power", University of California Lawrence Livermore National Laboratory, 2003, 40 pages.
Crump et al., ">76% CW Wall-Plug Efficiency at High Powers from 0.98-uM Emitting Laser Diodes, Sheds Shows Route to 1KW CW Diode Laser Bar", ICALEO, 2005, Paper #402, doi: 10.2351/1.5060490.
Jaffe et al., "Opportunities and Challenges for Space Solar for Remote Installations", Naval Research Laboratory, NRL/MR/8243-19-9813, 2019, 103 pages.
EP-2056144-A1 English (Year: 2009).

* cited by examiner

SPACE-BASED SOLAR POWER SYSTEM

CROSS-REFERENCE TO RELATED APPLICATIONS

This application is a divisional of U.S. application Ser. No. 18/345,343, filed Jun. 30, 2023, which claims priority to U.S. Application Ser. No. 63/368,534, filed Jul. 15, 2022, the disclosure of each are incorporated by reference in their entirety.

BACKGROUND

Space-based solar power (SSP) systems have included microwave-based systems and optical systems. Microwave-based systems typically require large-filled apertures in space, along with large rectenna apertures on the ground. Such systems typically have safety issues based on allowable microwave exposure limits. Optical SSP systems have attempted to address the issues of microwave based SSP systems. Previously proposed optical SSP systems have potentially higher safe intensity limits than microwave based SSP systems. However, such previously proposed optical SSP systems have typically used small earth apertures that required high beam quality laser sources and use terrestrial solar cell arrays that are made of different materials than most solar cells used for large scale terrestrial power generation.

BRIEF SUMMARY

Implementations of the disclosed subject matter provide a system that may have an artificial light source disposed at a distance from earth or other celestial body, where the artificial light source is configured to project one or more beams of light onto the earth or other celestial body. The system may include a photovoltaic array disposed in an area on the earth or other celestial body that is 200 m-20 km or more in any one dimension that is configured to receive the projected one or more beams of light and is configured to convert the received one or more beams of light into electricity.

Implementations of the disclosed subject matter provide a system that may have at least one satellite that includes an artificial light source configured to project light onto earth or other celestial body, and a photovoltaic array configured to power the artificial light source. In the system, there may be a direct electrical connection between one or more cells of the photovoltaic array and the artificial light source that is unconditioned. At least a portion of the photovoltaic array may match an effective load impedance of the artificial light source.

Implementations of the disclosed subject matter provide a system having at least one satellite that may include an artificial light source that is configured to project one or more beams of light onto earth or other celestial body, a photovoltaic array electrically coupled to the artificial light source and configured to power the artificial light source, and a radiator panel thermally coupled to the artificial light source and configured to dissipate heat generated by the artificial light source when projecting the one or more beams of light. The system may include a terrestrial photovoltaic array disposed in an area on the earth or other celestial body that is 200 m-20 km or more in any one dimension in size that is configured to receive the projected one or more beams of light and is configured to convert the received one or more beams of light into electricity.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
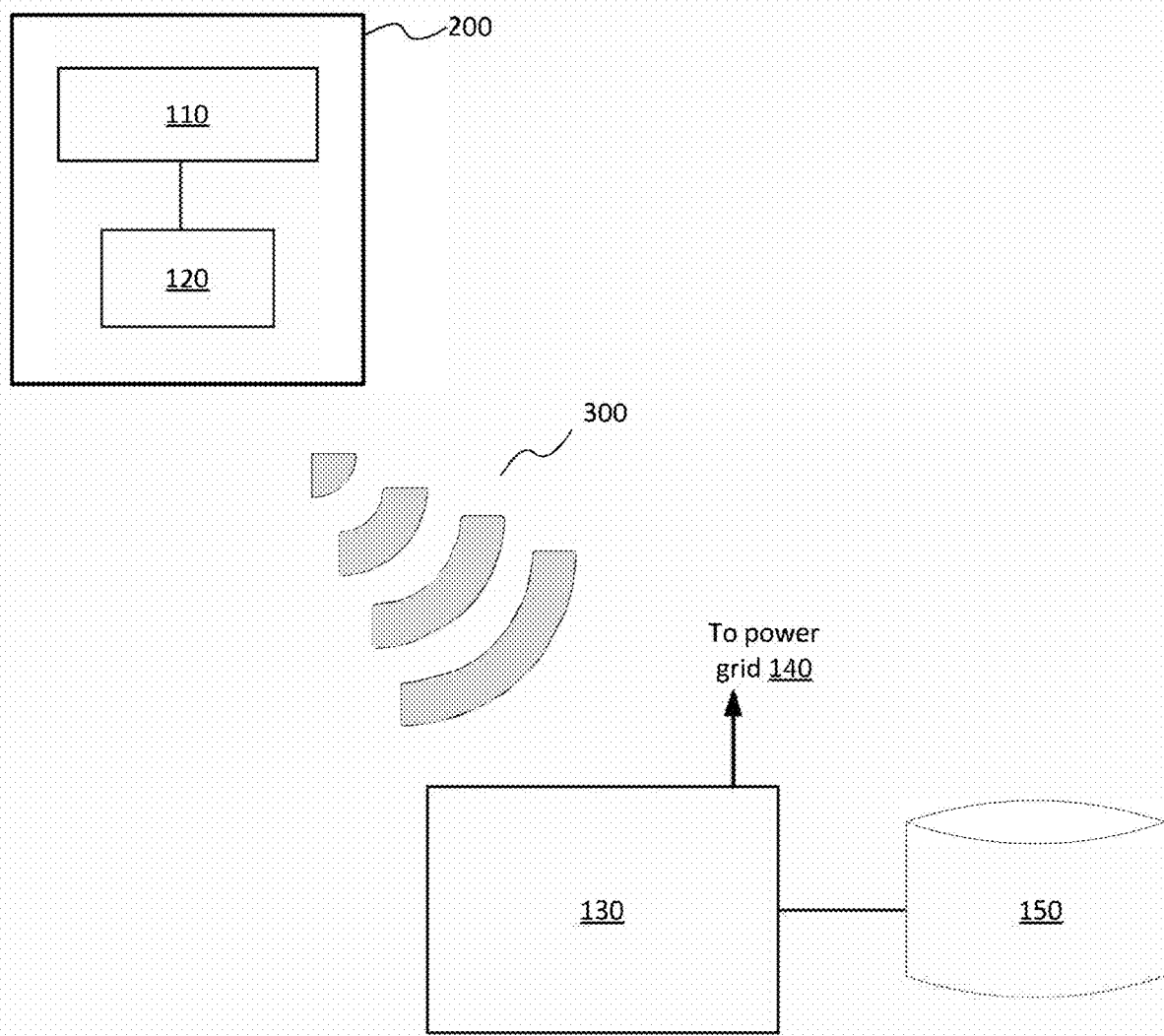
FIG. 1 shows an example space-based solar power (SSP) system according to implementations of the disclosed subject matter.

Implementations disclosed herein relate to systems, devices, and techniques for providing space-based solar power (SSP). Prior attempts to design or construct SSP systems typically fell into two categories: microwave-based systems and optical/infrared systems. Microwave systems garnered the most attention due to their perceived lower technology requirements. For example, there have been many laboratory demonstrations of microwave amplifiers at nearly the required efficiency and power density (typically at least 70% and 1000 W/kg or more), and rectenna electronics at the required efficiency (typically at least 70%). Based on those experiments and real-world terrestrial experiments sending multiple kW of power over multiple kilometer (km) distances, microwave-based SSP has classically been deemed more mature. However, the field has been held back by a variety of other limitations, including the requirement for large (multiple km across) filled apertures in space requiring in-space assembly, large rectenna apertures on the ground, safety and/or massive scale issues driven by the low allowable microwave exposure limits (typically in the tens of W/m² or less). Microwave-based solutions also suffer from the issues common to all prior SSP approaches, including launch costs, space assembly costs and difficulties, electronics expense, and the like.

Some optical SSP approaches have attempted to address these issues. The shorter wavelengths used by these techniques permit smaller apertures in space of 1 m or less compared to the multi-kilometer scale needed for microwave-based approaches, which would enable the system to be a group of independently launched, deployed, and operated satellites. Such satellites would be small enough to eliminate in-space assembly of large structures. Optical (especially near infrared (IR)) lasers have potentially higher safe intensity limits, but they are still less than ~1 kW/m²

(for extended exposures), limiting the utility of the small earth apertures allowable with good beam quality laser sources. That is, such safety intensity limits that are less than ~1 kW/m² are for laser sources that act as a point source, such as those used in prior optical SSP approaches. In contrast, laser sources used in implementations of the disclosed subject matter may be extended sources (e.g., visually extended sources), where the intensity (power per unit area) may safely exceed ~1 kW/m². The artificial light sources used in implementations of the disclosed subject matter may extended over a larger area of the sky (e.g., in a plurality of satellites), which may safely provide light without damaging human or animal eyes. Beam quality of such prior optical SSP approaches may be based on beam parameter product (BPP) values, beam divergence, and the like. Low values of BPP imply a high beam quality.

Conventional optical SSP systems proposed using diode pumped solid state lasers (DPSSL) or other diode pumped lasers (e.g., diode pumped Alkali lasers) to provide both the high total power, for example using coherently or incoherently combined arrays, as well as relatively good beam quality. While these systems deliver reasonably high efficiency and good beam quality, their wavelength (typically greater than 1 μm for DPSSLs) requires that expensive photovoltaic receiver cells be used, such as those having expensive III-V material based cells. As such, ground efficiency and economic considerations tend, in these past proposals, to drive optical solutions toward small receiver areas. While these small areas reduce the cost of the receiver array, they require high (unsafe) intensities to obtain reasonably large amounts of power, and extremely precise pointing and tracking to ensure that the delivered beams remain on the small receiver. The lower efficiency of DPSSLs, the expensive receivers, the need for precision pointing, and the requirement of high intensities have resulted in conventional optical SSP techniques being unacceptable both technically and economically.

Prior systems have attempted to leverage the relatively short wavelength of lasers to enable a small spot size on earth with a small aperture in space. Such arrangements would be advantageous because they may minimize the receiver cost on the ground and the telescope cost in space. However, to obtain large amounts of power, such systems have faced an unavoidable tradeoff—either dramatically exceed safe intensities on the ground or use a much larger receiver on the ground. To date, neither option has been feasible. As realized in implementations of the disclosed subject matter discussed throughout, if maintaining a safe intensity is chosen, the resulting minimum receiver size for large scale economically interesting power levels becomes sufficiently large where the transmit aperture in space becomes very small, or, more importantly, the spatial coherence (effectively, laser beam quality) becomes less important.

Typically, these prior systems relied on diode-pumped fiber or diode-pumped bulk lasers, which convert the efficient, but spatially incoherent light, emitted by large arrays of laser diodes (whether fiber coupled or not) into a much lower number of highly coherent beams to project to the earth. This usage of pumping unfortunately results in laser wavelengths that are typically greater than 1 μm, meaning the solar cell receiver arrays must use relatively exotic materials and cannot use the photovoltaic arrays in existing solar farms. Specifically, such receivers generally cannot be based on silicon, copper indium gallium diselenide (CIGS), cadmium telluride (CdTe), and/or perovskites, or other common, low-cost receiver materials and architectures. Other prior diode-pumped systems (e.g., diode-pumped alkali laser (DPAL) systems) used shorter wavelengths, but have efficiency losses, as well as cost and complexity issues that are similar to the aforementioned diode-pumped systems and/or diode-pumped solid state systems.

Implementations of the disclosed subject matter may use fiber-coupled diode laser arrays, as spatial coherence decreases in importance when using sufficiently large ground receivers. This arrangement may increase the electrical-to-optical efficiency by avoiding an intermediate optical-to-optical lasing conversion and may reduce the system mass. Implementations of the disclosed subject matter may use a larger receiver aperture of terrestrial photovoltaic arrays that may be provided by solar farms and receivers of comparable scale. Implementations of the disclosed subject matter may use an artificial light source in space that outputs beams having a low coherence, such as by using direct fiber coupled incoherently combined diode lasers. The disclosed subject matter may increase system efficiency, thereby reducing thermal demands and allowing for lower temperature operation. The ability to operate at lower temperatures may further improve efficiency of the artificial light source (e.g., laser efficiency). Implementations of the disclosed subject matter may shift the wavelengths of the artificial light source into a region that can easily pass through the atmosphere, and that may be converted at high efficiency by conventional solar arrays.

FIG. 1 shows a schematic representation of a space-based solar power system 10 according to implementations of the disclosed subject matter. One or more photovoltaic (PV) arrays 110 may be stationed in orbit as part of satellite 200. The PV arrays 110 may collect solar energy, and convert the collected solar energy to electrical energy, and store and/or transmit the energy to receiver 130 on earth or on another celestial body. The satellite 200 may include an artificial light source (e.g., diode lasers 120) which may be powered by the electrical energy from the PV arrays 110. Diode lasers 120 may be coupled to the PV arrays 110 and may be used to transmit the received and/or stored power to terrestrial photovoltaic arrays (e.g., receivers 130) via one or more beams 300. In some implementations, the diode lasers 120 may be directly coupled to the PV arrays 110, as discussed in detail below. The receivers 130 may be configured to be a size that may allow for broad or incoherent beam patterns from the diode lasers 120. The receivers 130 may use conventional PV arrays common in modern solar farms. The wavelengths of the one or more beams 300 output from the laser diodes 120 may be selected to match the most efficient absorption wavelength(s) of the receivers 130 as disclosed in further detail below. The receivers 130 may convert the received laser light from the one or more beams 300 into electricity for use and/or storage, such as via the conventional power grid 140, battery-based or similar storage systems 150, or the like. Although one satellite 200 is shown in FIG. 1, there may be a plurality of satellites 200 which may output beams 300 to one or more receivers 130.

The efficiency of the diode lasers 120 may be inversely correlated with junction temperature. In lab testing, laser diodes with room temperature efficiencies of 60-65% can approach efficiencies of 75-85% when cooled to temperatures below 0° C. Some lab tests yield diode efficiencies of 85% at −40° C., while others establish efficiencies of >70% at ~0° C.

The inverse correlation between efficiency and temperature has little impact on typical laser diode systems because the energy cost of refrigeration and/or cooling of the laser diodes is greater than the energy savings of the increased efficiency. However, this inverse correlation between efficiency and temperature becomes important when operating laser diodes in a space application as with the implementations disclosed herein. In space, when properly accounting for thermal inputs from the sun, earth, and/or other celestial body, the background temperatures are extremely low. These thermal inputs for a SSP according to the disclosed subject matter may be addressed through shielding, blocking, and/or high emissivity/low absorptivity coatings or materials. As such, effectively arbitrarily low temperatures in space may be limited only by sunlight exposure, materials, and heat flux per unit area. For example, materials may be selected to achieve an economically low enough mass. That is, if low cost, high conductivity materials are selected, there may be more radiator panel per unit waste heat, which allows for the diode lasers 120 to be run at colder temperatures. The lighter the radiator panel (e.g., higher conductivity per unit mass for the fins), the colder the laser (e.g., diode laser 120) may be. This may reduce both the power needed and the size of the PV array (e.g., PV array 110).

Therefore, when using diode lasers in space, especially for power beaming applications, this temperature dependent efficiency effect may be exploited, along with low mass, low temperature radiators, and modern low absorption and/or high emissivity coatings, to achieve substantially higher than normal laser diode efficiencies. While this effect has been known generally with regards to terrestrial laser applications, to date it has not been applied to space applications and specifically not for power beaming applications in space using diode lasers.

Near infrared (NIR) lasers may have high efficiencies and may be used for power beaming applications, as existing solar cell technologies may be used as receivers. For typical existing mass-produced solar cells technologies, including III-V cells (such as gallium arsenide (GaAs) cells), cadmium telluride (CdTe) cells, copper indium gallium diselenide (CIGS) cells, and silicon cells, the NIR wavelengths may maximize conversion efficiency. This is due to the photon energy being close to, but not under, the bandgap energy of those materials. This effect may improve and/or maximize quantum efficiency (the ratio of electrons created to photons absorbed) and may also improve and/or maximize the power efficiency, as any energy in the photon that is greater than the bandgap energy is wasted as heat.

By selecting artificial lighting sources (e.g., lasers) that efficiently generate wavelengths that are close to the bandgap of the materials of conventional solar arrays, the overall system efficiency can be increased and/or maximized. As the receiver technology of implementations of the disclosed subject matter uses existing, mass produced, large area solar cells/modules/farms, the need for narrow beams to reduce system cost is reduced and/or eliminated. The benefit of this combination is two-fold. While diode-pumped lasers have better beam quality than direct diode lasers, their longer wavelengths require exotic receiver cell technology (e.g., solar arrays made from unconventional materials), and their overall transmission efficiency is lower. Accordingly, implementations disclosed herein may use diode lasers as an artificial light source, without using an intermediate step to pump a different material.

Implementations of the disclosed subject matter may utilize diode lasers directly by incoherently combining the light from a plurality of diodes into transport fibers. Beams from the lasers and transport fibers may be combined and then directed, or simply directed through optics to receivers on the ground. This arrangement may enable improvements in beamed solar power, as discussed below in connection with FIGS. 2A-2B.

Figure 3:
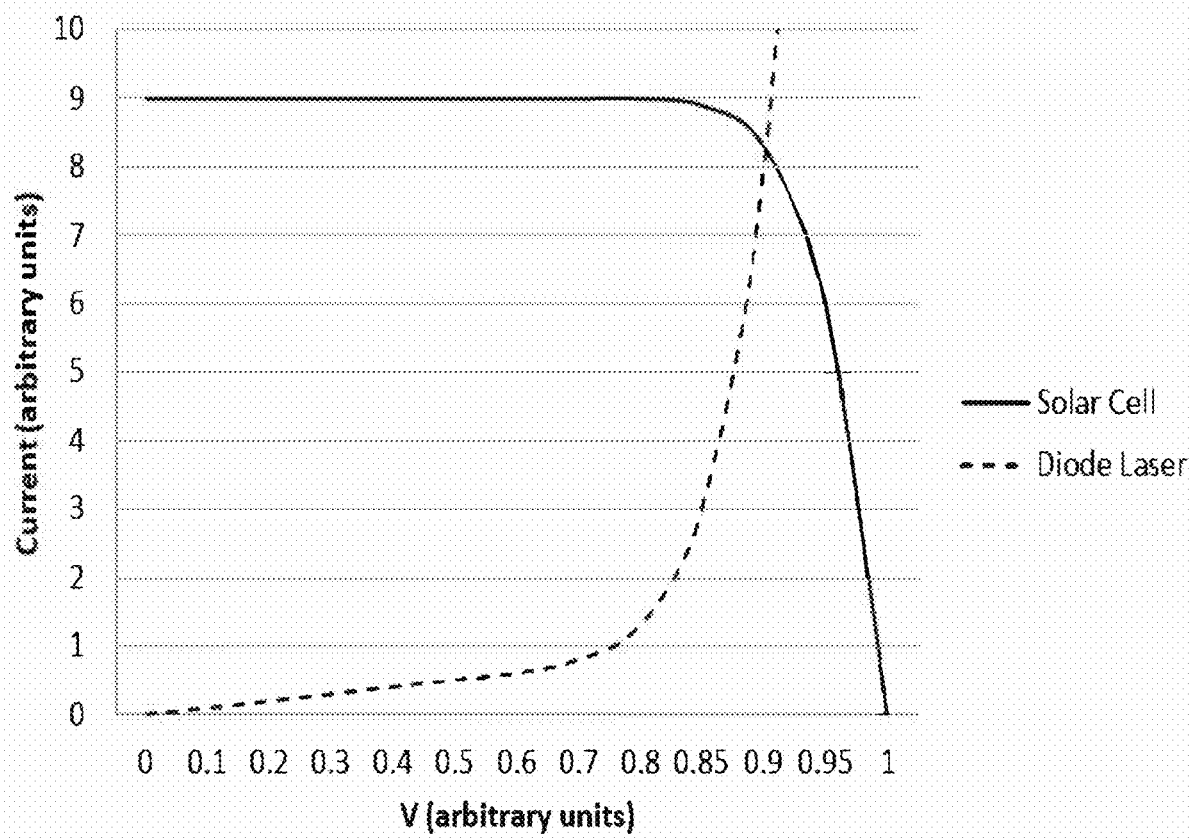
FIG. 3 shows example current-voltage curves in arbitrary current and voltage units for a solar cell and a laser diode according to implementations of the disclosed subject matter.

Laser diodes typically require driver electronics to prevent overcurrent damage. This is because, being diode devices, their current-voltage curve manifests as an effectively flat section with little slope up until a threshold voltage/current, at which point the slope of the current/voltage curve rises dramatically. As shown in FIG. 3, a current-voltage curve for the diode laser has low slope (i.e., is effectively flat) until a threshold point (e.g., the 0.8 arbitrary voltage units point shown in FIG. 3), at which the current/voltage curve rises with increased slope. This slope is dependent on the temperature of the device, manufacturing variation, device age, and other factors. Because of the steepness of this curve, low source impedance, current-controlled power supplies may be used, but such power supplies are typically complex, heavy, and/or expensive and reduce overall efficiency.

Similarly, the current-voltage curve for a solar cell is typically a nearly flat section (i.e., constant current at increasing voltage starting at the short circuit current) up until a certain point, where the current drops off rapidly to zero as the voltage reaches the open-circuit voltage of the cell. As shown in FIG. 3, a current-voltage curve for a solar cell may be nearly flat until a threshold point (e.g., the 0.85 arbitrary voltage units point shown in FIG. 3), where the voltage/current has a substantial decrease (i.e., an increasingly negative slope to zero). In normal operation, maximum power-point tracker (MPPT) circuitry is used to adjust the effective load impedance to operate a power supply at the knee of the curve of the solar cell (e.g., starting at about the 0.85 arbitrary voltage units point as shown in FIG. 3) to extract maximum power.

In both the laser and solar cell cases, the power electronics typically take the form of high frequency switching DC-DC converters and sometimes include smoothing and/or linear stages to provide precision current control or current limiting. When operating solar cells and diode lasers in an effectively constant fashion for beamed space solar power, implementations of the disclosed subject matter may eliminate both of those sets of power electronics (i.e., the power electronics for the lasers and the solar cells).

With matching of the series-parallel arrangement of quantities of solar cells and laser diodes, implementations of the disclosed subject matter may match the current-voltage (I-V) curves of the two devices. That is, when the I-V curves of the solar cell and the diode laser are appropriately matched, the near-constant-current output of the solar cells may provide the current limiting for safe laser diode operation, and may use the threshold voltage and/or diode-like impedance behavior of the laser diode to extract maximum possible power from the solar cells.

Implementations disclosed herein may operate without intervening power electronics which conventionally would be required for stability by matching the I-V curves of the two devices and by matching the series-parallel arrangement of quantities of solar cells and laser diodes as discussed above. That is, by using this matching, implementations of the disclosed subject matter do not use conventional high bandwidth electronics (e.g., conventional power electronics). In some implementations, an extremely low bandwidth shunt and/or fixed shunt (e.g., a bypass) current control may be used to accommodate manufacturing variation of the devices and/or to accommodate a beginning of operation designed-in overcurrent so aging may be addressed. The use of this low bandwidth or fixed shunt (bypass) is not for stability or safety, but may be used to maximize the output power over time. That is, a conservative fixed setpoint may be used and which may be stable over time, but may output slightly less power.

Figure 2A:
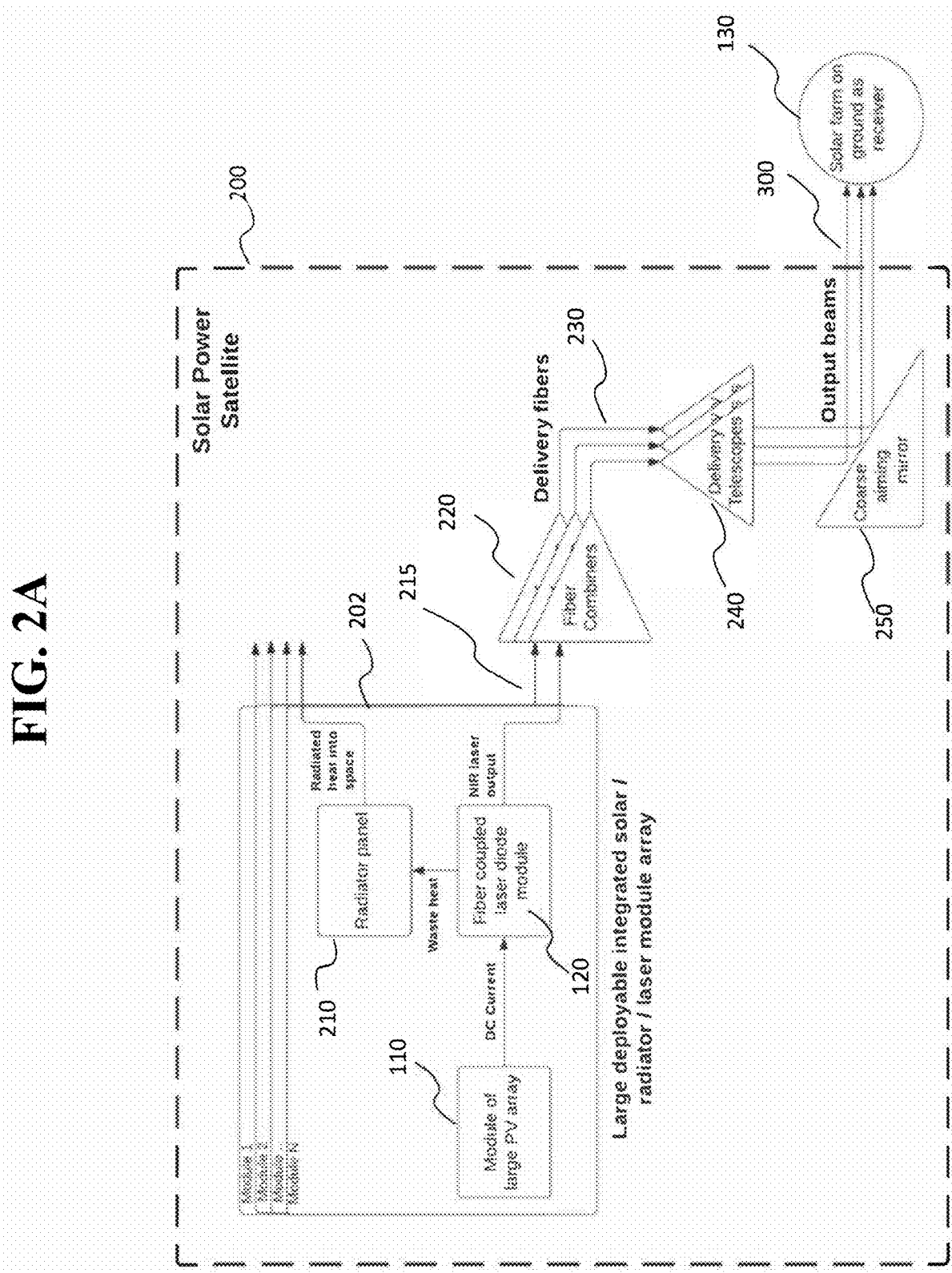
FIGS. 2A-2B show example SSP satellites and terrestrial photovoltaic arrays according to implementations of the disclosed subject matter.
Figure 2B:
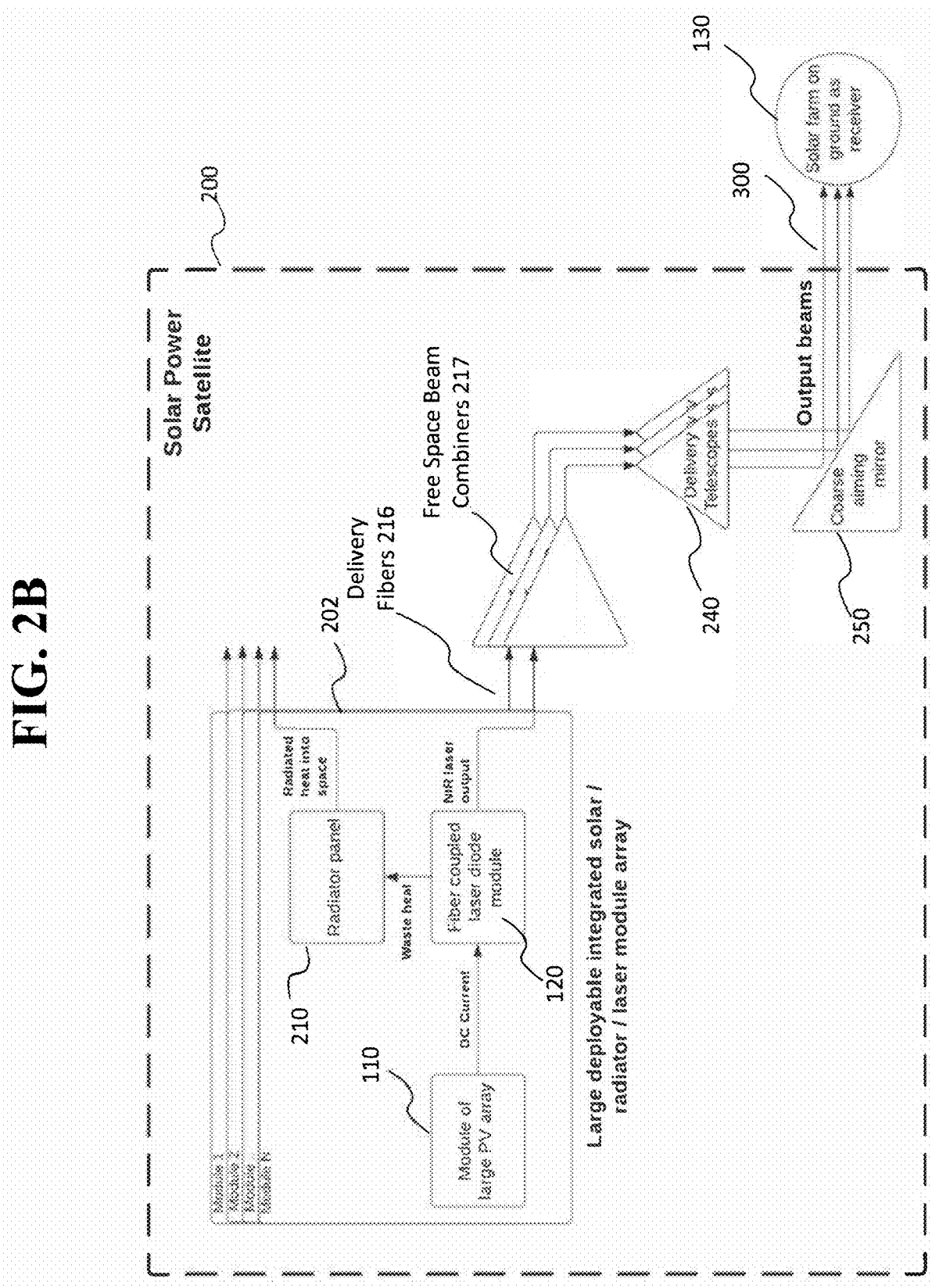

FIGS. 2A-2B show examples of the SSP satellite 200 and the terrestrial receiver 130 of FIG. 1 according to implementations of the disclosed subject matter. The satellite 200 may have a plurality of modules 202 that may include the one or more PV arrays 110, one or more laser diode modules 120, one or more radiator panels 210, and/or one or more output fibers 215. The one or more PV arrays 110 may convert sunlight into electrical power. The one or more laser diode modules 120 may convert the electrical power to optical power and deliver optical power to fiber. For example, as shown in FIG. 2A, the output for the one or more laser diode modules 120 may be provided to output fibers 215, one or more of which may be combined using fiber combiners 220 to form one or more delivery fibers 230. Alternatively, the output from the one or more laser diode modules 120 may be directly provided to the delivery telescope 240 for transmission to the one or more receivers 130 on earth and/or on another celestial body. In another example, FIG. 2B shows the output for the one or more laser diode modules 120 may be provided to delivery fibers 216, where beams from the delivery fibers may be combined by the free space beam combiners 217 and provided to delivery telescopes 240.

As shown in FIGS. 2A-2B, the one or more radiator panels 210 may be used to reject waste heat from the laser diode module 120. The one or more delivery telescope 240 may project optical power generated by the laser diode modules 120 at a divergence that may match the one or more terrestrial receivers 130. The laser diode modules 120 and receivers 130 may be IV-curve-matched to improve the power transmission efficiency. As shown in FIG. 2A, fiber combiners 220 may be used to combine one or more of the output fibers 215 from the laser modules 120 into a lower number of delivery fibers 230 before transferring power to the one or more delivery telescopes 240 for transmission to one or more terrestrial receivers 30. As shown in FIG. 2B, free space beam combiners 217 may combine the beams received from delivery fibers 216 and provide the combined beams to the one or more delivery telescopes 240 for transmission to one or more terrestrial receivers 30. As shown in FIGS. 2A-2B, a coarse aiming mirror 250 may be used to turn the output beams 300 of the delivery telescopes 240 toward earth and/or other celestial body and provide coarse aiming of those beams to the one or more receiver 130 that may be part of a solar farm on the ground and/or on another celestial body.

As described above, implementations disclosed herein benefit from developments and insights that have not been available or not sufficiently exploited in prior SSP systems. The receiving terrestrial array used in implementations of the disclosed subject matter need not be very small, but may be on the order of a size of a modern solar farm. Using a large receiving spot size (e.g., the area of the receivers of the solar farms) may allow for the energies involved to be exceptionally safe in comparison to conventional approaches. A large receiving spot size may allow for relatively inexpensive but efficient incoherently combined diode laser arrays to transmit orbital power to the terrestrial receivers. The artificial light sources used in implementations of the disclosed subject matter may extend over a larger area of the sky (e.g., in a plurality of satellites), which may safely provide light to the large receiving spot size (e.g., the terrestrial receivers) without damaging human or animal eyes. In some implementations, existing solar farms may be used, since high-efficiency NIR-wavelength lasers as described throughout in connection with the disclosed implementations may be used. Illuminating existing solar farms with the wavelengths that match, for example, the wavelengths that conventional solar cells may efficiently receive and convert into electricity may result in increased efficiency, which has been unachievable by prior systems. Operating laser diodes using an orbital solar panel may be self-current-limiting and may eliminate the need for most power electronics, further reducing the complexity and expense of the system without sacrificing efficiency.

As shown in FIGS. 1-3, implementations of the disclosed subject matter provide a system (e.g., system 10 shown in FIG. 1) that may have an artificial light source (e.g., diode laser 120 shown in FIGS. 1-2B) disposed at a distance from earth or other celestial body, where the artificial light source is configured to project one or more beams of light (e.g., beams 300 shown in FIG. 1) onto the earth or other celestial body. The system may include a terrestrial photovoltaic array (e.g., receiver 130 shown in FIGS. 1-2B) disposed in an area on the earth or other celestial body that is 200 m-20 km or more in any one dimension and/or in diameter that is configured to receive the projected one or more beams of light and is configured to convert the received one or more beams of light into electricity. For example, the terrestrial photovoltaic array (e.g., receiver 130 shown in FIGS. 1-2B) may be disposed in an area that is greater than 20 km in any one dimension, such as between 21-30 km, 31-50 km, 51-70 km, 71-100 km or more in any one dimension.

The artificial light source may be diode lasers 120 shown in FIGS. 1-2B. A peak wavelength range of the one or more beams of light of the artificial light source may be 750 nm-2000 nm. For example, the artificial light source for the system may have a peak wavelength range of 800-1020 nm. In another example, the artificial light source for the system may have a peak wavelength range of 780-850 nm. In yet another example, the artificial light source for the system may have a peak wavelength range of 940-1020 nm. The example peak wavelength ranges of the artificial light source may have wavelengths of 808 nm, 915 nm, and/or 976 nm. In some implementations, a minimum beam parameter product (BPP) of the artificial light source may be greater than 10 mm-mrad. The BPP may be a product of the beam radius (measured at the beam waist) and the beam divergence half-angle. In some implementations, the artificial light source may have a range of 10-100 mm-mrad.

The artificial light source, along with the peak wavelength range, may be selected based on an efficiency range of the terrestrial photovoltaic array. The terrestrial photovoltaic array may be terrestrial receivers 130 shown in FIGS. 1-2B. For example, the terrestrial photovoltaic array may be formed from silicon, gallium arsenide (GaAs), indium gallium arsenide (InGaAs), aluminum gallium arsenide (AlGaAs), copper indium gallium diselenide (CIGS), cadmium telluride (CdTe), perovskites, and/or other suitable materials to convert light into electricity. Based on the efficiency of the one or more materials that form the terrestrial photovoltaic array, an artificial light source having a peak wavelength range may be selected that matches the efficiency of the one or more materials of the terrestrial photovoltaic array. That is, a bandgap of a material that forms the terrestrial photovoltaic array may be matched to a range of wavelengths of light that the artificial light source is configured to output that are not longer than those corresponding to the bandgap of the material of the terrestrial photovoltaic array, as discussed in detail above.

The artificial light source may be a plurality of lasers, which may be laser diodes, fiber lasers, diode-pumped solid-state lasers, and the like. In some implementations, the lasers of the artificial light source may be multimodal, and may have less coherency than single-mode lasers. Coherent light is light which has photons that oscillate at the same frequency and that has wavelengths that are in phase. In contrast, the photons of incoherent light oscillate at different frequencies, and their wave lengths are not in phase with each other. The beams of the artificial light source having the multimodal lasers may be less coherent, for example, than coherent beams from single-mode lasers.

In some implementations, the artificial light source may include a plurality of modules, where each module includes a plurality of laser diodes coupled to a delivery fiber. For example, the modules may be laser diode modules 120 shown in FIGS. 2A-2B. The one or more modules (e.g., laser module 120 shown in FIGS. 2A-2B) may be configured to operate at a temperature of 210 K-315 K.

Delivery fibers 215 may be coupled to the laser diode modules 120. The one or more of the deliver fibers 215 from the plurality of modules 120 may be combined into free space beams that form the projected one or more beams of light (e.g., beams 300 shown in FIGS. 2A-2B) from the system. For example, as shown in FIG. 2A, output fibers 215 from laser diode modules 120 may be combined by fiber combiners 220 that may be coupled to the delivery fibers 230. In another example, as shown in FIG. 2B, delivery fibers 216 from the laser diode modules 120 may have output beams that may be combined in free space by the free space beam combiners 217. Beam combining arrangements other than those shown in FIGS. 2A-2B may be used, such as using polarization beam combination, further spatial combination, or spectral beam combination in one or more steps using gratings, dichroic mirrors, and/or other frequency selective elements.

The light from the plurality of sources may be coherently or incoherently combined. When the combination of light is coherent, the combined light may have photons that oscillate at the same frequency and have waveforms that are in phase. When the light is incoherently combined, the combined light may have photons that oscillate at different frequencies and have waveforms that are out of phase from one another.

In FIG. 2A, the delivery fibers 230 may be coupled to a plurality of delivery telescopes 240. In FIG. 2B, the output of the free space beam combiners 217 may be provided to the delivery telescopes 240. In FIGS. 2A-2B, beams output from the delivery telescopes 240 may be reflected off a mirror 250 to form output beams 300. In some implementations, the beams of light projected by artificial light source may have reduced coherency when multimode diode lasers are used as the artificial light source.

The output beams may be directed to the terrestrial photovoltaic array (e.g., receiver 130) disposed in an area on earth or on another celestial body. In some implementations, the terrestrial photovoltaic array may be part of a solar farm which may receive one or more of the output beams 300.

As shown in FIGS. 1-2B, the system may include a satellite having the artificial light source (e.g., diode lasers 120), a photovoltaic array (e.g., PV array 110) electrically coupled to the artificial light source and configured to power the artificial light source, and at least one radiator panel (e.g., radiator panel 210). The photovoltaic array of the satellite may be formed from silicon, gallium arsenide (GaAs), indium gallium arsenide (InGaAs), aluminum gallium arsenide (AlGaAs), copper indium gallium diselenide (CIGS), cadmium telluride (CdTe), perovskites, and/or other suitable materials or combinations of these materials in a multi-junction cell to convert light into electricity.

The size of the satellite may be less than 1000 m, less than 1200 m, less than 1500 m, less than 1800 m, less than 2000 m, and/or any other suitable distance in any direction. The artificial light source may be thermally coupled to at least one radiator panel, where the radiator panel dissipates heat from the artificial light source when it is operating. That is, the at least one radiator panel may be configured to dissipate heat generated by the artificial light source into space. In some implementations, one or more of the modules may be distributed over the at least one radiator panel.

In some implementations, the at least one radiator panel may be configured to increase the efficiency of the artificial light source and/or to increase the output power of the artificial light source. As the radiator panel may be thermally coupled to the artificial light source to dissipate the heat generated by the artificial light source during operation. By the dissipation of heat, the radiator panel may increase the operating efficiency of the artificial light source, and/or may increase the optical power of the light output by the artificial light source.

A selection of a size of the at least one radiator panel and a mass of the at least one radiator panel decreases an amount of the artificial light source electrical power to be used for the system of a given optical output power. A selection of the size and/or the mass of the at least one radiator panel may be based on a total mass of the satellite. This selection may decrease a size of the photovoltaic array of the satellite and may increase a size of the radiator panel.

A relationship of a mass of the at least one radiator panel and temperature of the at least one radiator panel to an efficiency of a remainder of the satellite may decrease a combined total mass of the photovoltaic array of the satellite and the at least one radiator panel. That is, the radiator panel may be configured to radiate the power left over from the inefficiency of the artificial light source. A selected mass of the radiator panel per unit output power and the mass of the photovoltaic array of the satellite per unit output power may allow the total mass of the satellite including the radiator panel, photovoltaic array, and artificial light source to be less and/or the efficiency higher. That is, the configuration of the radiator panel and the temperature may allow the total mass of the satellite to be less and/or the efficiency higher.

Implementations of the disclosed subject matter provide a system that may have a satellite (e.g., satellite 200 show in FIGS. 1-2B) that includes an artificial light source (e.g., diode laser 120 shown in FIGS. 1-2B) configured to project light onto earth or onto another celestial body, and a photovoltaic array (e.g., PV array 110 shown in FIG. 1) configured to power the artificial light source. The artificial light source may include at least one module having a plurality of delivery fibers (e.g., delivery fibers 215 shown in FIG. 2A, and/or delivery fibers 216 shown in FIG. 2B), where each delivery fiber is coupled to one or more laser diodes. In the system, there may be a direct electrical connection between one or more cells of the photovoltaic array (e.g., PV array 110) and the artificial light source (e.g., laser diodes 120) that is unconditioned.

Maximum power point trackers (MPPTs) for solar arrays and power supplies for laser sources are typically impedance modulators, and adjust the effective load (for a MPPT) or source impedance (such as for a laser diode driver) via a switching power supply or similar device. In some implementations of the disclosed subject matter, there is no active element (e.g., such as the switching power supply) between the photovoltaic array of the satellite and the artificial light source. The direct electrical connection may be a bandwidth shunt and/or a fixed shunt (e.g., a bypass), as discussed in detail above. In some implementations, active power electronics may be used between the photovoltaic array of the satellite and the artificial light source.

At least a portion of the photovoltaic array may match an effective load impedance of the artificial light source. For example, a source impedance curve of a series-parallel arrangement of the photovoltaic array of the satellite may be matched to the load impedance curve of the artificial light source, as discussed in detail above. In some implementations, the matching may use the current output of the photovoltaic array of the satellite to provide current limiting for the artificial light source. In some implementations, the matching uses a current-voltage response of the artificial light source to extract a maximum power from the photovoltaic array as shown in FIG. 3 and discussed in detail above.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system comprising:
  at least one satellite including:
    an artificial light source configured to project light onto earth or another celestial body; and
    a photovoltaic array configured to power the artificial light source,
    wherein there is a direct electrical connection between one or more cells of the photovoltaic array and the artificial light source that is unconditioned, and
    wherein at least a portion of the photovoltaic array matches an effective load impedance of the artificial light source by matching a source impedance curve of a series-parallel arrangement of the photovoltaic array to a load impedance curve of the artificial light source.

2. The system of claim 1, wherein the artificial light source comprises:
  at least one module including:
    a plurality of laser diodes; and
    a plurality of delivery fibers, wherein each delivery fiber is coupled to one or more of the plurality of laser diodes.

3. The system of claim 1, wherein the matching uses a current output of the photovoltaic array to provide current limiting for the artificial light source.

4. The system of claim 1, wherein the matching uses a current-voltage response of the artificial light source to extract a maximum power from the photovoltaic array.

5. The system of claim 1, wherein the direct electrical connection comprises at least one selected from a group consisting of: a bandwidth shunt, and a fixed shunt.

* * * * *